(No Model.)

G. M. DOERSCH.
TIRE TIGHTENER.

No. 604,606. Patented May 24, 1898.

Witnesses
Jas. H. Blackwood
H. P. Doolittle

Inventor
George M. Doersch
by M. Doolittle & Son
Attorneys

UNITED STATES PATENT OFFICE.

GEORGE M. DOERSCH, OF ANTIGO, WISCONSIN, ASSIGNOR OF ONE-HALF TO RICHARD KOEBKE, OF SAME PLACE.

TIRE-TIGHTENER.

SPECIFICATION forming part of Letters Patent No. 604,606, dated May 24, 1898.

Application filed April 26, 1897. Serial No. 633,913. (No model.)

*To all whom it may concern:*

Be it known that I, GEORGE M. DOERSCH, a citizen of the United States, residing at Antigo, in the county of Langlade and State of Wisconsin, have invented certain new and useful Improvements in Tire-Tighteners; and I do hereby declare the following to be a full, clear, and exact description of the invention, such as will enable others skilled in the art to which it appertains to make and use the same.

My invention relates to tire-tighteners and felly-protectors, and has for its object to provide means for moving outwardly the tire and felly from the spokes to permit of the insertion of a suitable packing and clasp to tighten the tire and felly and protect the latter from splitting.

My invention consists of a clamp adapted to be secured to the spokes of a wheel and having two clamping-arms, in each of which is mounted a set-screw carrying a saddle or bearing-block, which blocks are adapted to be forced against the felly to move the same outwardly on the spoke-tenon.

My invention is illustrated in the accompanying drawings, in which—

Figure 1:
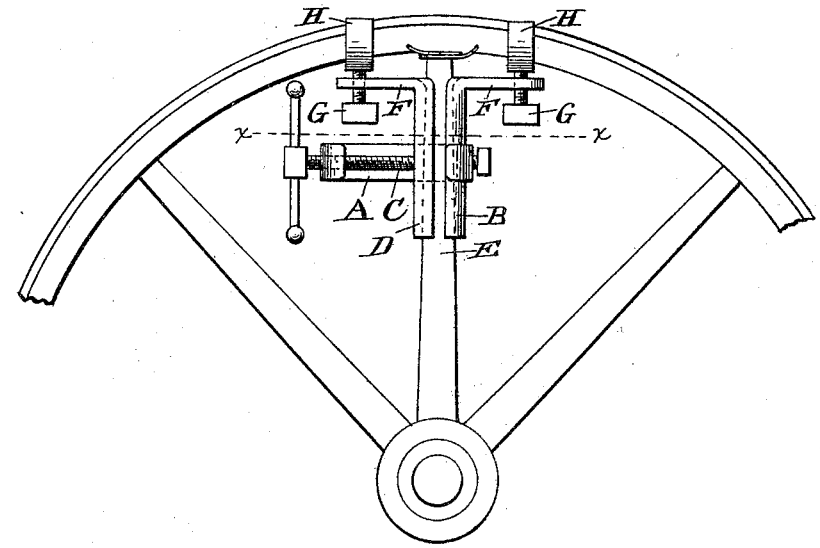
Figure 2:
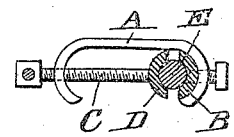
Figure 3:
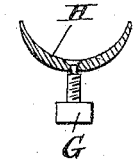

Figure 1 is a side view showing the device attached to a wheel. Fig. 2 is a section on line *x x* of Fig. 1; Fig. 3, a detail section of swiveled saddle.

Referring to the drawings, A is a bar curved at each end and provided with threaded apertures to receive at one end a screw, by means of which a concave clamping-arm B is fastened to the bar, and at the other end a threaded bolt C. The bolt C is provided at one end with a handle for turning the same, and carries at its opposite end another clamping-arm D. These arms are adapted to embrace and be clamped against the spoke E when the bolt is screwed up. At the outer ends of the arms B D are horizontal shoulders F F. Through these shoulders are passed set-screws G G, on the ends of which are swiveled saddles H H, adapted to bear against the felly of the wheel.

After the device has been clamped to one of the spokes the set-screws are screwed outwardly, forcing the saddles against the felly, and thus lifting the latter from its seat against the shoulder of the spoke. A suitable packing or packings are then placed on the tenon between the felly and the shoulder of the spoke. The pressure is then relieved and the felly and tire allowed to spring back into place. Such a packing may be the same as that described in my pending application, Serial No. 633,912, which consists of two clasps adapted to have their ends bent up and driven into the sides of the felly to protect the same against splitting; but any other suitable packing adapted to take up space between the parts of the wheel and tighten the tire and spokes may be employed.

Having thus described my invention, what I claim is—

A tire-tightener for wheels comprising in combination a clamp having two arms with concave inner surfaces to embrace a spoke of the wheel, each of said arms bent at its top at a right angle and there provided with a set-screw and a swiveled saddle on said screw, an open bar having curved ends and secured at one end to one of said clamping-arms, and provided at the other end with a threaded aperture, a threaded bolt passing through said aperture and bearing against the other clamping-arm, said bolt provided on its outer end with means to turn the same and to move the clamping-arms from or against the spokes and the saddles to and from each other, substantially as described.

In testimony whereof I affix my signature in presence of two witnesses.

GEORGE M. DOERSCH.

Witnesses:
JOHN A. OGDEN,
MILLIE E. CURTIS.